United States Patent [19]

Fuhrmann et al.

[11] Patent Number: 5,048,647
[45] Date of Patent: Sep. 17, 1991

[54] CONTAINER PISTON ROD UNIT

[75] Inventors: Castor Fuhrmann, Brachtendorf; Herbert Freitag, Koblenz, both of Fed. Rep. of Germany

[73] Assignee: Stabilus GmbH, Koblenz-Neuendorf, Fed. Rep. of Germany

[21] Appl. No.: 403,734

[22] Filed: Sep. 6, 1989

[30] Foreign Application Priority Data

Sep. 16, 1988 [DE] Fed. Rep. of Germany ....... 3831502

[51] Int. Cl.⁵ .......................... F16F 9/36; B65D 53/00
[52] U.S. Cl. .................................. 188/322.17; 277/59
[58] Field of Search ..................... 188/322.17; 92/142, 92/165 R; 277/DIG. 6, 135, 59

[56] References Cited

U.S. PATENT DOCUMENTS

| 3,856,287 | 12/1974 | Freitag | 188/322.17 X |
| 4,306,729 | 12/1981 | Hiramatsu et al. | 277/DIG. 6 X |
| 4,342,447 | 8/1982 | Marx | 188/322.17 X |
| 4,360,192 | 11/1982 | Ishida | 277/59 X |
| 4,568,777 | 4/1985 | Yamamoto et al. | 277/235 B X |

FOREIGN PATENT DOCUMENTS

| 3016919 | 11/1981 | Fed. Rep. of Germany . |
| 53536 | 2/1985 | Fed. Rep. of Germany . |
| 3702581 | 8/1988 | Fed. Rep. of Germany | 188/322.17 |
| WO86/00966 | 2/1986 | PCT Int'l Appl. . |

Primary Examiner—Robert J. Oberleitner
Attorney, Agent, or Firm—Brumbaugh, Graves, Donohue & Raymond

[57] ABSTRACT

In a gas spring, the piston rod extends through one end of a container. Sealing rings are provided at this end of the container. These sealing rings are in sealing engagement with the piston rod and possibly also in sealing engagement with the inner surface of the container. Axially subsequent sealing rings are made of different caoutchouc materials. These different caoutchouc materials have different coefficients of permeation.

11 Claims, 1 Drawing Sheet

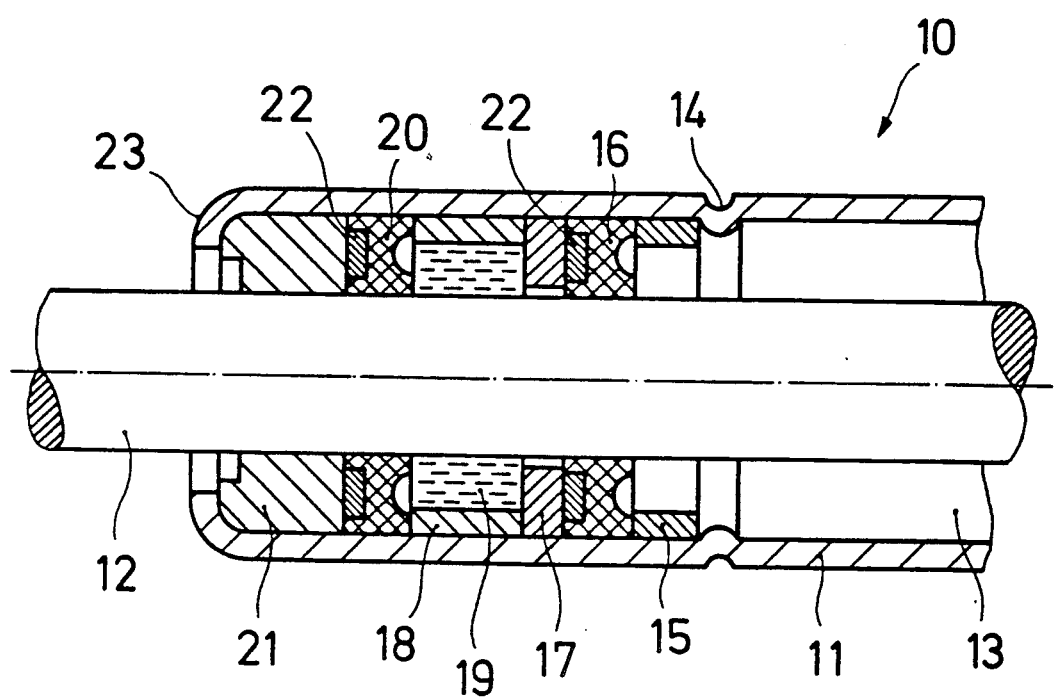

CONTAINER PISTON ROD UNIT

BACKGROUND OF THE INVENTION

In container piston rod units like gas springs, the piston rod is guided through a sealing system at one end of the respective container. This sealing system is responsible for the maintenance of a gas pressure within the container. Usually, the sealing rings are made of rubber-like material. It is a problem to select the rubber-like material such that even at varying operating temperatures the sealing effect is maintained.

STATEMENT OF THE PRIOR ART

Sealing systems for gas springs, such as are described by way of example in DE-OS 3,016,919, serve to increase the band width of use of the sealing material utilized. In the sealing of gas springs, ordinarily, rubber materials are used as sealing elements, which materials in dependence upon temperature and time permit gas molecules to escape from the interior of the pressure chamber into atmosphere. This passage of a gas through a solid body, known as permeation, is completed in the case of elastomers or rubber materials in three steps, namely the solution of the gas in the elastomer, the diffusion of the dissolved gas through the elastomer, and the evaporation of the gas out of the elastomer. The characteristic constant for this action is the coefficient of permeation, which indicates what volume of gas will pass at a given pressure difference in a specific time through a test body of known area and thickness, and is described in DIN 53,536 (German Industrie Norm 53,536).

Different rubber materials have different coefficients of permeation. Permeation is dependent, as well as upon the pressure and the existing rubber area, likewise upon the temperature, and it is to be observed that the permeation increases with rising temperature. In order to impart a longer life to gas springs which are used or stored predominantly at higher temperatures, it is therefore expedient to use in the sealing system a rubber material with lowest possible permeation. However, it is the disadvantage of such material that in dynamic use it does not possess an adequate cold stability. On the other hand, rubber materials exist which possess an adequate cold stability, but in which it is disadvantageous that their permeation is considerably greater.

OBJECT OF THE INVENTION

It is the object of the present invention to produce a seal system of the kind as initially described which has the lowest possible permeation in a wide temperature range. By these measures a good dynamic sealing is achieved which can be used in a range between about 233° and about 473° Kelvin. A gas spring with such a sealing system has a very low pressure loss, in the stated temperature range, by reason of the low coefficient of permeation of the one seal part and good cold stability in dynamic use by reason of the second seal part arranged in the double-sealing system.

SUMMARY OF THE INVENTION

A container piston rod unit comprises a container having an axis and two ends and defining a cavity therein. A piston rod extends through at least one of said two ends. A sealing system adjacent said at least one end is in sealing engagement with the piston rod. The sealing system comprises at least two annular sealing parts located one behind the other along the axis of the container. These annular sealing parts are made of different sealing materials having different coefficients of permeation.

The annular sealing parts may be spaced in axial direction.

In case of a gas spring, the cavity contains a volume of pressurised gas. In this case, an inner one of the annular sealing parts is adjacent the volume of pressurised gas, and an outer one is more remote from said volume of pressurised gas. In such case, preferably the inner annular sealing part has a smaller coefficient of permeation than the outer sealing part.

According to the different coefficients of permeation, the sealing parts may also have different cold stability in dynamic operation.

Both sealing parts may be made of a rubber elastic material. One of the annular sealing parts and preferably the inner one may be made of fluorine caoutchouc. Another one of said annular sealing parts and preferably the outer one may be made of acrylo-nitrile butadiene caoutchouc.

One of the annular sealing parts and preferably the inner one which is e.g. made of fluorine caoutchouc may have a solidification point of between 258° and 260° Kelvin. The other one of said annular sealing parts and preferably the outer one which is e.g. made of acrylo-nitrile butadiene caoutchouc may have a solidification point of between 229° and 233° Kelvin.

One of the annular sealing parts, preferably the inner one, which is e.g. made of fluorine caoutchouc, may have a coefficient of permeation for nitrogen ($N_2$) of between $0.12 \cdot 10^{-17} - 0.13 \cdot 10^{-17}$ $m^2 \cdot s^{-1} \cdot Pa^{-1}$ according to DIN 53 536 at a temperature of 303° Kelvin.

The other one of the annular sealing parts, preferably the outer one, which is e.g. made of acrylo-nitrile butadiene caoutchouc, may have a coefficient of permeation for nitrogen ($N_2$) of between $0.36 \cdot 10^{-17} - 0.37 \cdot 10^{-17}$ $m^2 \cdot s^{-1} \cdot Pa^{-1}$ according to DIN 53 536 at a temperature of 303° Kelvin.

The ratio of the respective coefficient of permeation for said annular sealing parts may be about 2-4 for a respective gas contained within the cavity when measured at a temperature of 303° Kelvin.

The various features of the invention are discussed especially in the accompanying claims which form a part of the disclosure. For the better understanding of the invention, its working advantages and specific effects, reference is now made to the accompanying drawings and the description, in which preferred forms of embodiment of the invention are discussed.

BRIEF DESCRIPTION OF THE DRAWINGS

The invention is represented in the accompanying drawing and will be described in greater detail below. The single FIGURE shows the diagrammatic representation of the piston rod sealing system of a pneumatic spring.

DETAILED DESCRIPTION OF THE PREFERRED EMBODIMENTS

The gas spring 10 as represented diagrammatically in the FIGURE consists essentially of a container tube 11 in which a piston (not represented) can be moved inwards and outwards with a Piston rod 12. The container tube 11 contains a compressed gas filling 13, e.g. nitrogen, the escape of which is to be prevented by a sealing system to be described later.

The double-sealing system comprises an inner piston rod seal 16 and an outer piston rod seal 20. Between these two piston rod seals 16 and 20 an oil chamber 19 is provided The inner piston rod seal 16 is held on the inner side facing the gas filling 13 by an inner support part 15 which is supported on a corrugation 14 formed by rolling in the container tube 11.

The inner piston rod seal 16 consists of a fluorine caoutchouc having a very low coefficient of permeation according to DIN 53,536. In order to stabilize the inner piston rod seal 16 in its form, it is provided on the side remote from the pressure with a stabilizing washer 22. This stabilising washer 22 is preferably a vulcanized in steel washer.

The inner piston rod seal 16 is held in its position in the axial direction on the pressure-remote side by an intermediate washer 17. The intermediate washer 17 again is held by an outer support part 18 which rests on the inner surface of the container tube 11 and lies free in relation to the piston rod 12. This outer support part 18 accommodates an oil chamber 19 which is closed off in the axial direction on the pressure-remote side by an outer piston rod seal 20.

The outer piston rod seal 20 is likewise provided with a stabilizing washer 22. The outer piston rod seal 20 consists of an acrylo-nitrile butadiene caoutchouc having a high cold stability. According to the profile of demand of the application, it is also possible for the outer piston rod seal 20 to consist of fluorine caoutchouc and the inner piston rod seal 16 to consist of an acrylo-nitrile butadiene caoutchouc.

The cold stability of the piston rod seal 20 is characterised by its solidification point, which lies at 229 to 233° Kelvin, while the solidification point of the inner piston rod seal 16 lies at 258° to 260° Kelvin. According to the profile of demand of the application, the piston rod seals 16 and 20 can also be inserted oppositely.

The inner piston rod seal 16 and the outer piston rod seal 20 lie radially outwardly on the inside of the container tube 11 and radially inwardly on the piston rod 12, in sealing manner. The piston rod 12 is axially outwardly guided in a piston rod guide 21 which at the same time on the pressure-remote side represents the conclusion of the gas spring 10 in the axial direction. The entire seal system is supported on the pressure-remote side by the piston rod guide 21, while on the pressure side it is held by the corrugation 14. The piston rod guide 21 is held in its position by a crimping-over 23 of the container tube 11.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

We claim:

1. A container piston rod unit comprising a container (11) having an axis and two ends and defining a cavity (13) therein, said cavity containing a volume of pressurized gas, a piston rod (12) extending through at least one of said two ends, a sealing system (16,20) adjacent said at least one end in sealing engagement with said piston rod (12), said sealing system (16,20) comprising at least two annular sealing parts (16,20) located one behind the other along said axis, said annular sealing parts (16,20) being made of different caoutchouc elastic sealing materials, one of said annular sealing parts (16,20) comprising a caoutchouc elastic sealing material having a higher solidification point and a lower coefficient of permeation for the respective gas than the other annular sealing part (16,20), the other one of said annular sealing parts (16,20) comprising a caoutchouc elastic sealing material having a lower solidification point and a higher coefficient of permeation for the respective gas than said one annular sealing part (16,20).

2. A container piston rod unit as set forth in claim 1, said annular sealing parts (16,20) being spaced axial direction.

3. A container piston rod unit as set forth in claim 1, an inner one (16) of said annular sealing parts (16,20) being adjacent said volume of pressurized gas, an outer one (20) of said annular sealing parts (16,20) being adjacent said volume of pressurized gas, an outer one (20) of said annular sealing parts (16,20) being more remote from said volume of pressurized gas, said inner annular sealing part (16) having a smaller coefficient of permeation and a higher solidification point than said outer annular sealing part (20).

4. A container piston rod unit as set forth in claim 1, said one (16) of said annular sealing parts (16,20) having the higher solidification point and the lower coefficient of permeation being made of fluorine caoutchouc.

5. The container piston rod unit as set forth in claim 4, the inner annular sealing part (16) being made of fluorine caoutchouc.

6. A container piston rod unit as set forth in claim 1, said one (20) of said sealing parts (16,20) having the lower solidification point and the higher coefficient of permeation being made of acrylo-nitrile butadiene caoutchouc.

7. A container piston rod unit as set forth in claim 6, said annular sealing part (20) made of acrylo-nitrile butadiene caoutchouc being said outer annular sealing part (20).

8. A container piston rod unit as set forth in claim 1, said volume of pressurized gas comprising nitrogen ($N_2$), one (16) of said annular sealing parts (16,20) having a solidification point of between 258° and 260° Kelvin and a coefficient of permeation for nitrogen ($N_2$) of between $0.12 \times 10^{-17} m^2 \cdot s^{-1} \cdot Pa^{-1}$ and $0.13 \times 10^{-17} m^2 \cdot s^{-1} \cdot Pa^{-1}$ at a temperature of 303° Kelvin and the other (20) of said annular sealing parts (16,20) having a solidification point of between 229° and 233° Kelvin and a coefficient of permeation for nitrogen ($N_2$) of between $0.36 \times 10^{-17} m^2 \cdot s^{-1} \cdot Pa^{-1}$ and $0.37 \times 10^{-17} m^2 \cdot s^{-1} \cdot Pa^{-1}$ at a temperature of 303° Kelvin.

9. A container piston rod unit as set forth in claim 8, wherein said one (16) annular sealing part is said inner annular sealing part (16) and said other (20) annular sealing part is the outer annular sealing part (20).

10. A container piston rod unit as set forth in claim 1, the ratio of the respective coefficients of permeation for said annular sealing parts (16,20) being about 2-4, for a respective gas contained within said cavity when measured at a temperature of 303° Kelvin.

11. A container piston rod unit as set forth in claim 1, the ratio of the respective coefficients of permeation for said annular sealing parts (16,20) being about 3 for a respective gas contained within said cavity when measured at a temperature of 303° Kelvin.

* * * * *

UNITED STATES PATENT AND TRADEMARK OFFICE
CERTIFICATE OF CORRECTION

PATENT NO. : 5,048,647

DATED : September 17, 1991

INVENTOR(S) : Fuhrmann et al.

It is certified that error appears in the above-identified patent and that said Letters Patent is hereby corrected as shown below:

On the title page, Item [54], Reference Cited "4,568,777" should read --4,508,777---;

Col. 4, lines 18-20, delete "being adjacent said volume of pressurized gas, an outer one (20) of said annular sealing parts (16,20)";

Col. 4, line 29, "The container" should read --A container--.

Signed and Sealed this

Thirtieth Day of March, 1993

*Attest:*

STEPHEN G. KUNIN

*Attesting Officer*    Acting Commissioner of Patents and Trademarks